Patented May 28, 1946

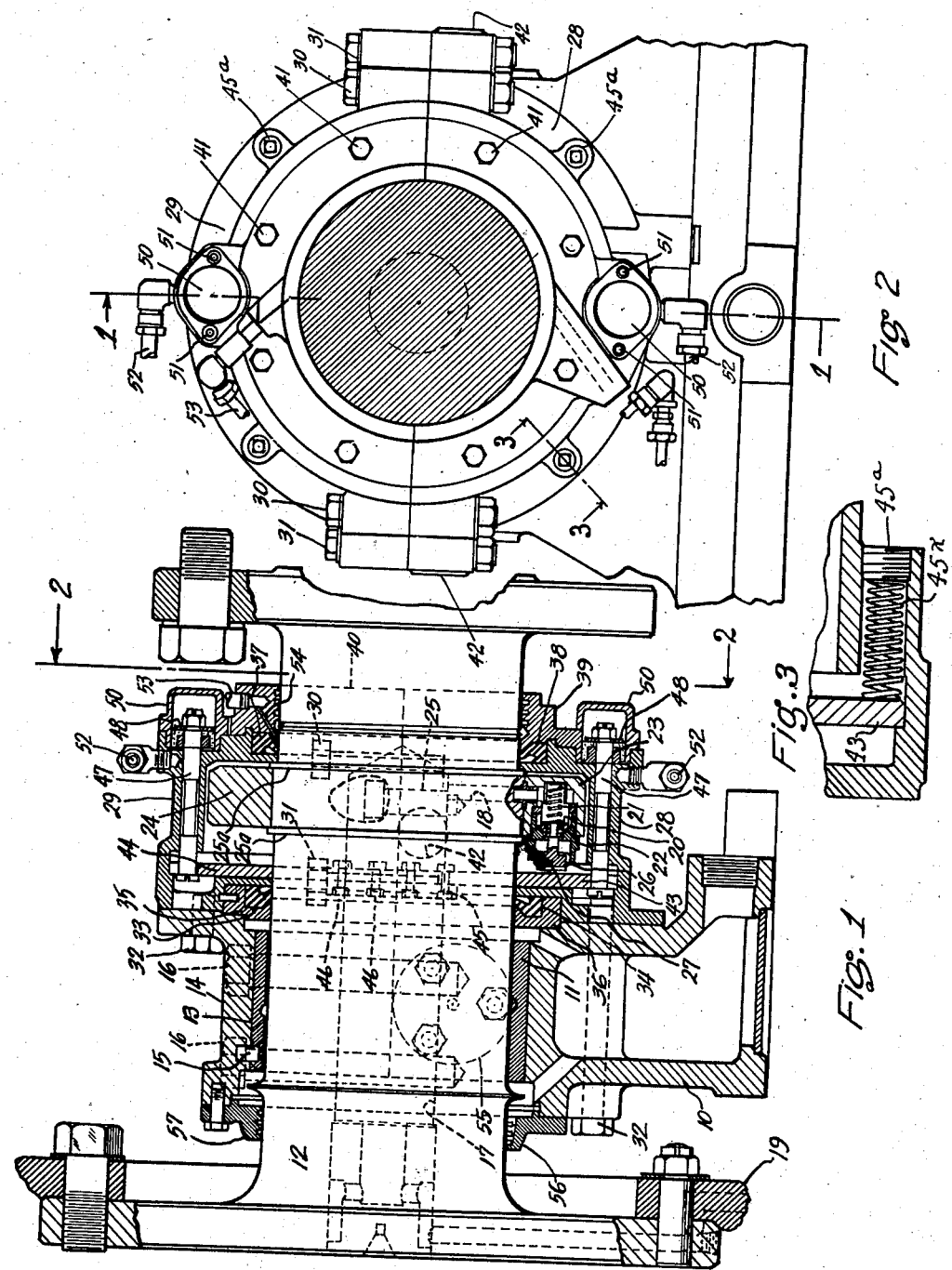

2,401,061

UNITED STATES PATENT OFFICE 2,401,061

VALVE ASSEMBLY

Thomas L. Fawick, Akron, Ohio

Application May 7, 1943, Serial No. 485,989

7 Claims. (Cl. 137—69)

This invention relates to structures comprising a rotatably mounted shaft formed with a fluid passage and a valve mechanism for controlling flow of fluid in the passage, as for charging and venting the air container of a pneumatically actuated clutch.

It is of especial value in the case of a shaft of such form or association that the air has to be conducted into the shaft through its side face. In such cases it is unsatisfactory to use ordinary stuffing glands for effecting permanent seals between the rotating shaft and stationary air-supplying means, because continuous relative movement of the shaft in contact with a packing member under sealing pressure quickly wears the packing member and renders the seal imperfect. Frequent setting up of the packing nut, and frequent replacement of packing members, are required, and the frictional braking effect of such a seal represents a considerable loss of power.

The chief objects of my invention are to provide an improved valve assembly requiring the sealing members to function only momentarily, at the time of clutch engagement, the sealing members then being without sealing pressure until the next time of clutch engagement; to provide non-rotating sealing members which seal directly against the shaft, so that wear and frictional braking effect are avoided not only because their functioning is only momentary but also because the sealing faces are at a short radius from the axis of rotation, where the peripheral speed is not great and where the braking effect does not operate at high mechanical advantage; to provide for assembly and disassembly of the other parts with the shaft wholly by relative movements transverse to the shaft, so that an end flange or end flanges on the shaft do not interfere with the assembling of the parts, and so that parts can be removed and replaced without removal of the shaft from its bearing or bearings; and to provide compactness, economy, facility of repair, and other advantages which will be manifest.

Of the accompanying drawing:

Fig. 1 is a vertical axial section, on line 1—1 of Fig. 2, of an assembly embodying my invention in its preferred form.

Fig. 2 is a transverse section of the same, on line 2—2 of Fig. 1.

Fig. 3 is a section on line 3—3 of Fig. 2.

Referring to the drawing, 10 is a floor bracket casting which supports the lower half 11 of a two-part bearing for a shaft 12.

The upper half 13 of the bearing is mounted in a bearing cap 14, with a dowel 15 interposed, and the bearing cap is held in place by cap screws 16, 16.

The shaft 12 is formed with an axial fluid passage 17 adapted to receive fluid from a transverse bore 18 which extends from a side face of the shaft to the passage 17, and the passage 17 at its other end leads to suitable channels for conducting fluid to its point of application, as for distending a fluid distensible clutch-engaging member (not shown) mounted upon an annular member 19 which is bolted to an end flange of the shaft 12.

Flow of fluid into the shaft 12, through the transverse bore 18, is through a check valve 20 which is backed by a spring 21 and is mounted in a plug-like valve seat member 22, seated in one half 23 of a two part ring of which the other half, 24, is secured to the first by bolts such as the bolt 25, the two part ring 23, 24 thus being clamped upon the shaft 12 and seating between two annular ribs $25^a$, $25^a$ formed upon the shaft.

The check-valve 20 is provided with a guiding and opening stem 26 which is slidably mounted in the valve-seat plug 22 and is formed for passage of fluid past it and into the passage 18 through the check valve. The outer end of the valve-guiding and valve-opening stem 26 is provided with an anti-friction facing member 27 of bronze or the like.

For conducting fluid under pressure to the check valve, a lower chamber section 28 and an upper chamber section 29, secured to each other by bolts 30, 30 and 31, 31 are secured to the floor casting 10 and the bearing cap 14 by bolts 32, 32 (Fig. 1). Thus the non-rotating members 28 and 29 define a chamber surrounding the shaft 12 and enclosing the two-part ring 23, 24 and the check-valve structure.

For providing an annular occasional seal between the left-hand wall of the non-rotating chamber and the shaft 12, a two part lip-seal gasket of oil resistant material is interposed, the upper section of the gasket being shown at 33 and the lower half at 34, doweled half-rings 35, 36 providing a seat for the lip gasket. Similarly a lip seal is provided between the right-hand wall of the non-rotating chamber and the shaft by half-rings 37, 38 of oil-resistant material, which are held in place by two half-rings 39, 40 which are secured to the two-part chamber structure by bolts 41, 41 (Fig. 2).

For charging and venting the annular chamber, the lower chamber defining member 28 is formed with diametrically opposite fluid inlet-outlet apertured bosses 42, 42 provided with suitable pipe and valve connections, not shown, so that the chamber can be charged and vented alternatively from either side.

For venting fluid from the shaft 12 by opening the check valve 20, a two part annular plate 43, 44, having its two parts held together by bridge plates such as the plate 45 and bolts such as the bolts 46, 46, is mounted in the chamber, surrounding the shaft 12, and is adapted to contact the anti-friction facing 27 of the valve stem 26 when moved to the right of Fig. 1.

Helical compression springs 45$^x$, 45$^x$, backed by spring-seat plugs 45$^a$, 45$^a$, Fig. 3, urge the plate 43, 44 toward its limit of leftward movement as viewed in Fig. 1.

For actuating the plate, piston stems 47, 47 have headed ends engaged in notches formed in the periphery of the plate, the stems being slidably mounted in guideways formed in the chamber-defining members and having upon their other ends pistons 48, 48 working in cylinders 50, 50 which are secured to the chamber-defining members by cap screws 51, 51 (Fig. 2), the cylinders being adapted to be concurrently charged and vented through inlet-outlet pipes 52, 52 provided with suitable valves, not shown.

Suitable provision is made, as shown, for lubrication of all of the parts, through oil inlet caps such as the cap 55 (Fig. 1). The oil piping includes an oil supply pipe 53 adapted to supply oil to the gasket 37, 38 through an oil hole 54 formed in the gasket-retaining member 40. The other gasket, 33, 34, receives lubrication from the large shaft bearing 11, 13.

Oil drain corrugations are formed on the inner faces of the gasket-retaining half-rings 39, 40 and on the inner faces of two half-rings 56, 57 bolted to the bearing members 10 and 14.

In the operation of the device for charging the shaft 12 with fluid under pressure, compressed air is admitted to the annular chamber through one or the other of the inlet-outlet bosses 42. The compressed air forces open the check valve 20, and through it enters the shaft 12.

The clutch being thus engaged, the annular chamber is vented to the atmosphere, whereupon the air pressure within the shaft, aided by the spring 21, closes the check valve, so that compressed air is trapped within the shaft 12 and parts connected therewith, to keep the clutch engaged.

When the clutch is to be disengaged, fluid under pressure is admitted to the cylinders 50, 50 through the pipes 52, 52, forcing the pistons 48, 48 and the annular plate 43, 44 to the right as viewed in Fig. 1, the non-rotating plate thus being brought into contact with the facing 27 of the valve stem 26 and forcing the check valve open.

If, as may occur after a long run with the clutch engaged, the pressure within the shaft 12 gets too low, it can be quickly given a new shot of air by momentarily admitting air under pressure to the annular chamber.

It is assumed for illustrative purposes in this description that air is employed as the fluid under pressure, but the invention is not limited to operating the device with air.

As the gaskets 33, 34, 37, 38 are under sealing pressure only during the very short times required for passing air into the shaft 12, they are not subject to quick deterioration.

As each of the members surrounding the shaft 12 is made in two semi-circular parts, corresponding advantages set forth in the above statement of objects are provided.

The halves of each gasket are merely butted against each other at their ends, and yet they provide an adequate seal.

Any small leakage of the charging fluid would not be a serious matter, because it would not be continous but would occur only for the short periods during which air is being passed into the shaft 12.

Modifications are possible within the scope of the appended claims.

I claim:

1. A valve assembly comprising a rotatably mounted shaft formed with a fluid passage, means constrained to rotate with said shaft and defining a chamber in communication with said passage, an inwardly-opening, normally closed check valve associated and rotating with an apertured wall of said chamber for admission of fluid into the chamber, non-rotating means defining a fixed pressure-fluid chamber surrounding said shaft and in communication with the check-valve aperture for compelling fluid to flow into said chamber through said check valve when the differential of pressures in the two chambers is sufficient to open the check valve, and means independent of such flow of fluid for opening the same check valve while it is rotating with the chamber and the shaft.

2. A valve assembly comprising a rotatably mounted shaft formed with a fluid passage, a check valve rotating with the shaft and adapted to admit fluid into said passage, the check valve opening toward said passage but being normally closed, non-rotating means defining a fixed pressure-fluid chamber surrounding said shaft and in communication with the check valve for forcing fluid into the passage through the check valve when the differential of pressure on the two sides of the valve is sufficient to open it, the check valve opening and closing by movement lengthwise of the shaft, and a contact member movable lengthwise of the shaft for opening the same check valve and thus effecting a venting of fluid from the passage during rotation of the shaft.

3. A valve assembly comprising a rotatably mounted shaft formed with a fluid passage, a check valve rotating with the shaft and adapted to admit fluid into said passage, the check valve opening toward said passage but being normally closed non-rotating means defining a fixed pressure-fluid chamber surrounding said shaft and in communication with the check valve for forcing fluid into the passage through the check valve when the differential of pressure on the two sides of the valve is sufficient to open it, the check valve opening and closing by movement lengthwise of the shaft, and a member movable lengthwise of the shaft and coacting with the check valve for opening it during rotation of the shaft.

4. A valve assembly comprising a rotatably mounted shaft formed with a fluid passage, a check valve rotating with the shaft and adapted to admit fluid to said passage, the check valve opening toward said passage but being normally closed non-rotating means defining a fixed pressure-fluid chamber surrounding said shaft and in communication with the check valve for forcing fluid through said check valve into said passage when the differential of pressure on the two sides of the valve is sufficient to open it, and means independent of such flow of fluid for opening the same check valve during rotation of the shaft.

5. A valve assembly comprising a rotatably mounted shaft formed with a fluid passage, a check valve rotating with the shaft and adapted to admit fluid to said passage, the check valve opening toward said passage but being normally closed, a non-rotating structure which with the shaft defines a pressure fluid chamber in communication with said check valve, a non-rotating member in said chamber coacting with said check valve for unseating it, and means for moving said member and thus causing it to coact with said check valve for opening the valve while it is rotating with the shaft.

6. A valve assembly comprising a rotatably mounted shaft formed with a fluid passage, a check valve rotating with the shaft and adapted to admit fluid to said passage, the check valve opening toward said passage but being normally closed, a non-rotating structure which with the shaft defines a pressure-fluid chamber in communication with said check valve, a non-rotating member in said chamber coacting with said check valve for unseating it, and means for moving said member and thus causing it to coact with said check valve for opening the valve while it is rotating with the shaft, the said member being a ring and the means for moving it comprising a fluid-impelled member.

7. A valve assembly comprising a rotatably mounted shaft formed with a fluid passage, a check valve assembly rotating with the shaft and adapted to admit fluid into said passage, the check valve opening toward said passage but being normally closed, and a non-rotating structure which with the shaft defines a pressure-fluid chamber in communication with said check valve, said non-rotating structure being segmental for presentation to the shaft from a direction transverse to the latter, the said non-rotating structure including a segmental sliding contact member mounted in the chamber and adapted to be moved axially into sliding contact with a rotating member constituting a part of the check-valve assembly to open the check valve for effecting a venting of said passage while the shaft is rotating.

THOMAS L. FAWICK.